United States Patent [19]

Dahlgren

[11] Patent Number: 5,022,735
[45] Date of Patent: Jun. 11, 1991

[54] FIBER SPLICE COATING SYSTEM

[75] Inventor: Robert P. Dahlgren, Somerville, Mass.

[73] Assignee: The Charles Stark Draper Laboratory, Inc., Cambridge, Mass.

[21] Appl. No.: 432,980

[22] Filed: Nov. 7, 1989

[51] Int. Cl.$^5$ .................. G02B 6/38; H01B 13/00; H01B 17/34; B05D 3/06
[52] U.S. Cl. .................. 350/96.21; 427/54.1; 156/48
[58] Field of Search ............... 350/96.10, 96.15, 96.20, 350/96.21, 96.22, 320; 156/48, 158; 427/54.1

[56] References Cited

U.S. PATENT DOCUMENTS

| | | | |
|---|---|---|---|
| 4,291,940 | 9/1981 | Kawasaki et al. | 350/96.15 |
| 4,400,055 | 8/1983 | Ozeki et al. | 350/96.15 |
| 4,410,561 | 10/1983 | Hart, Jr. | 427/54.1 |
| 4,550,974 | 11/1985 | Murphy | 350/96.15 |
| 4,593,968 | 6/1986 | Giallorenzi | 350/96.15 |
| 4,634,858 | 1/1987 | Gerdt et al. | 250/227 |
| 4,664,732 | 5/1987 | Campbell et al. | 156/158 |
| 4,822,128 | 4/1989 | Imoto et al. | 350/96.16 |
| 4,865,411 | 9/1989 | Darsey et al. | 350/96.21 |
| 4,869,570 | 9/1989 | Yokohama et al. | 350/96.15 |
| 4,906,068 | 3/1990 | Olson et al. | 350/96.20 |

OTHER PUBLICATIONS

"Protection of Optical Fiber Arc Fusion Splices"-Journal of Optical Communications 3(1982) 1, pp. 19-25. S. Stueflotten.
"Fiber-Optic Coupler Sensors: Biomedical Applications"-Sensors, Sep. 1988.
"Variable Coupler Fiber Optic Sensor"-Sperry Marine Inc., D. W. Gerdt.

Primary Examiner—Akm Ullah
Attorney, Agent, or Firm—Lahive & Cockfield

[57] ABSTRACT

A spliced fiber is recoated by injection molding a jacket segment over the bare splice region. The dimensions of the recoated fiber approximate those of an undisturbed fiber, and the coating material may be selected to match the physical and mechanical properties of the original fiber jacket. A fixture is shown for performing the recoating.

15 Claims, 4 Drawing Sheets

FIBER SPLICE COATING SYSTEM

BACKGROUND OF THE INVENTION

The present invention relates to optical fiber splices, and more particularly to the protection of a fiber splice from degradation due to the surrounding environment and physical stress.

A typical optical fiber is fabricated as a thin filament of silica-based material with a core region of one refractive index and a peripheral cladding of a lesser index. A jacket, typically of a strong flexible plastic having a thickness several times that of the filament, is generally provided to add strength and to protect the fiber from physical and chemical damage. When two or more such fibers are to be spliced end-to-end, the jacket is first removed from a portion of each fiber and the bare fiber ends are then spliced. The splice region therefore remains unprotected, and may be subjected to localized stresses from physical contact. It is also vulnerable to absorbing atmospheric vapors which can alter the fiber characteristics and degrade its performance.

In order to achieve a splice which does not absorb material from the environment or is not subject to undue physical stresses at the junction region, it is customary to cover the fiber junction with a support structure and to fill the support with a potting medium. See, for example, U.S. Pat. No. 4,593,968 of Giallorenzi.

Such structures, however, are cumbersome, and fibers spliced in this manner do not lend themselves to the flexible packaging constraints often required of fiber optic instrumentation. Moreover, the provision of a splice-protecting structure can require special mounts and may itself introduce unwanted stresses in the fiber. Further, such structures require a cumbersome fabrication process.

SUMMARY OF THE INVENTION

It is therefore desirable to provide a splice of simple fabrication and having versatile packaging characteristics.

It is also desirable to provide a protective cover for an optical fiber splice having substantially uniform physical characteristics with the unaltered fiber.

These and other features are achieved in accordance with the present invention by forming and curing an injection-molded jacket segment about a fiber splice so that the segment forms a continuous body with the original fiber jacketing on either side of the splice. A jig for forming the jacket segment includes a multi-part mold having a die block with a fiber-receiving groove, and a cover plate for closing the die block so that the groove becomes an injection mold cavity about the fiber. An ultraviolet-transmissive window communicates with the cavity so that a curable medium injected into the cavity may be UV-hardened about the fiber splice. Bleeder passages at the ends of the groove assure that a complete and homogeneous segment is formed over the unjacketed portions of the fiber splice, and preferably an injection means such as a screw-threaded plunger provides a metered quantity of the coating medium through another passage communicating with the cavity. The curable medium is selected to have physical properties when cured, substantially matching those of the normal fiber jacket.

BRIEF DESCRIPTION OF THE DRAWINGS

The invention will be understood from the following description of the principles of operation together with a detailed description of one embodiment thereof, illustrated in the drawings, wherein.

DETAILED DESCRIPTION OF THE INVENTION

In accordance with the present invention, a robust easily maneuverable optical fiber splice is achieved by providing a bare junction region of a spliced fiber with an injection molded jacket which extends between the surrounding unstripped jacket portions of the fiber.

Figure 1A:
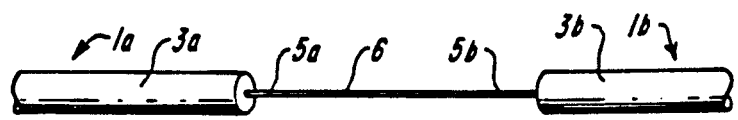
FIG. 1 shows a fiber splice and coating formed according to one embodiment of the present invention.
Figure 1B:
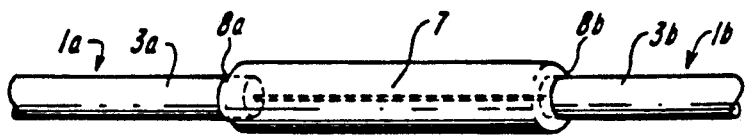

FIG. 1 shows such a splice. At "A", a pair of fibers 1a, 1b each having a protective jacket 3a, 3b, respectively, have been stripped of their jackets to reveal the bare inner fiber 5a, 5b consisting of a light-carrying core and an optically confining cladding. The two bare fibers 5a, 5b have been fused end-to-end at point 6, forming a splice which joins the two into a single light conductor. This much is conventional in the art, and may be effected, for example, using a commercially available Orionics, Inc. or Fujikura, Ltd. electric arc fusion splicer apparatus.

At "B" the joined fibers 1a, 1b have received an injection-molded cover 7, which extends in a thin cylinder-shaped body over the bare inner fiber 5a, 5b and is sealed about the adjoining jacket regions 3a, 3b at cuffs 8a, 8b. The dimensions of the cover 7 are only slightly greater than those of the jacket. By way of scale, the diameter of a normal fiber jacket 3a may be approximately 0.2 to 0.5 millimeters, and the block may be approximately one-half to one millimeter wide.

The cover 7 is preferably formed, in accordance with the invention, by injection molding of a polymeric resin such as curable silicone or acrylate resin into a specially constructed mold cavity which accommodates both the bare fibers and the adjacent jacket ends.

Figure 2:
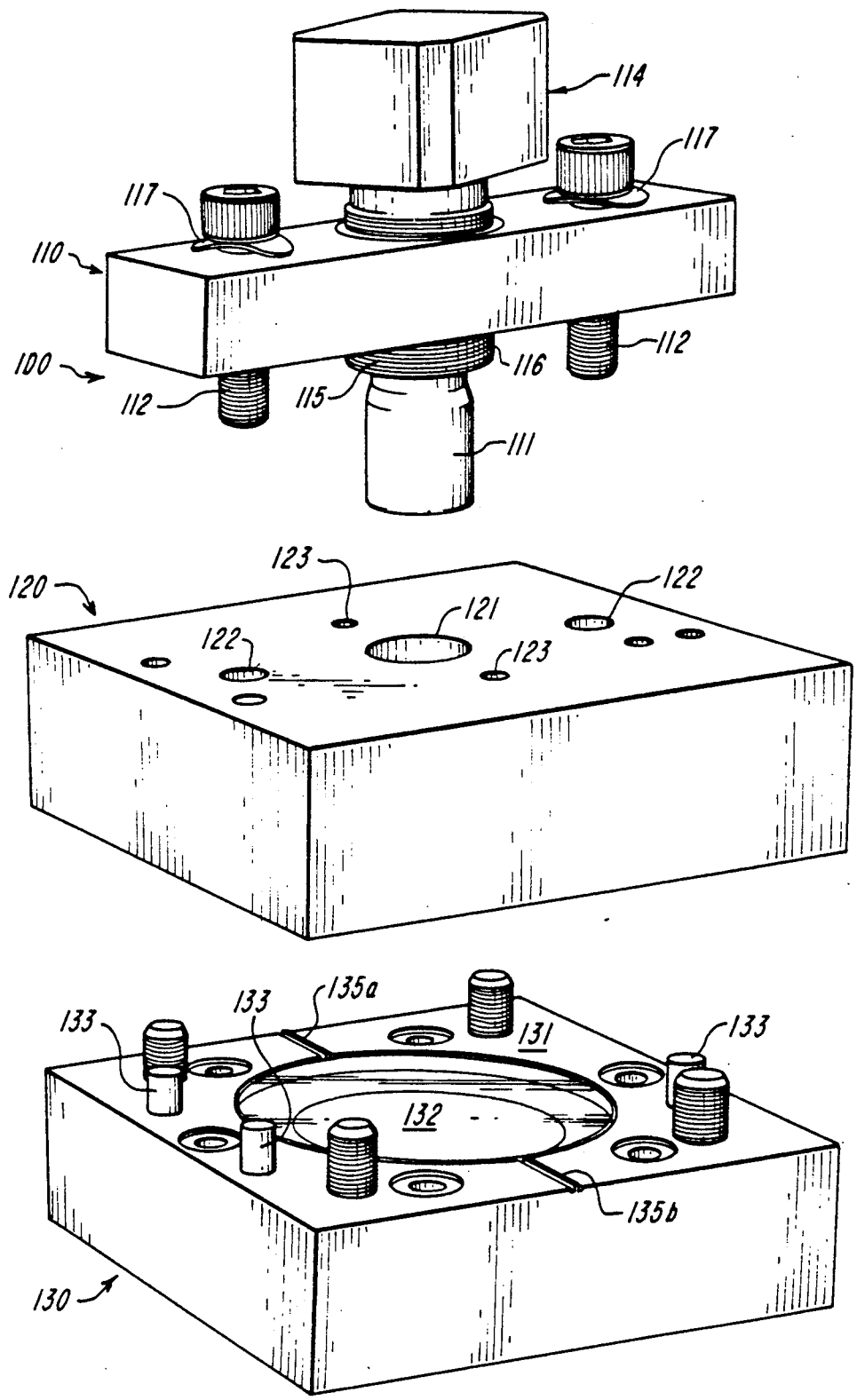
FIGS. 2 and 3 are exploded top and bottom perspective views of a jig for forming the coating.
Figure 3:
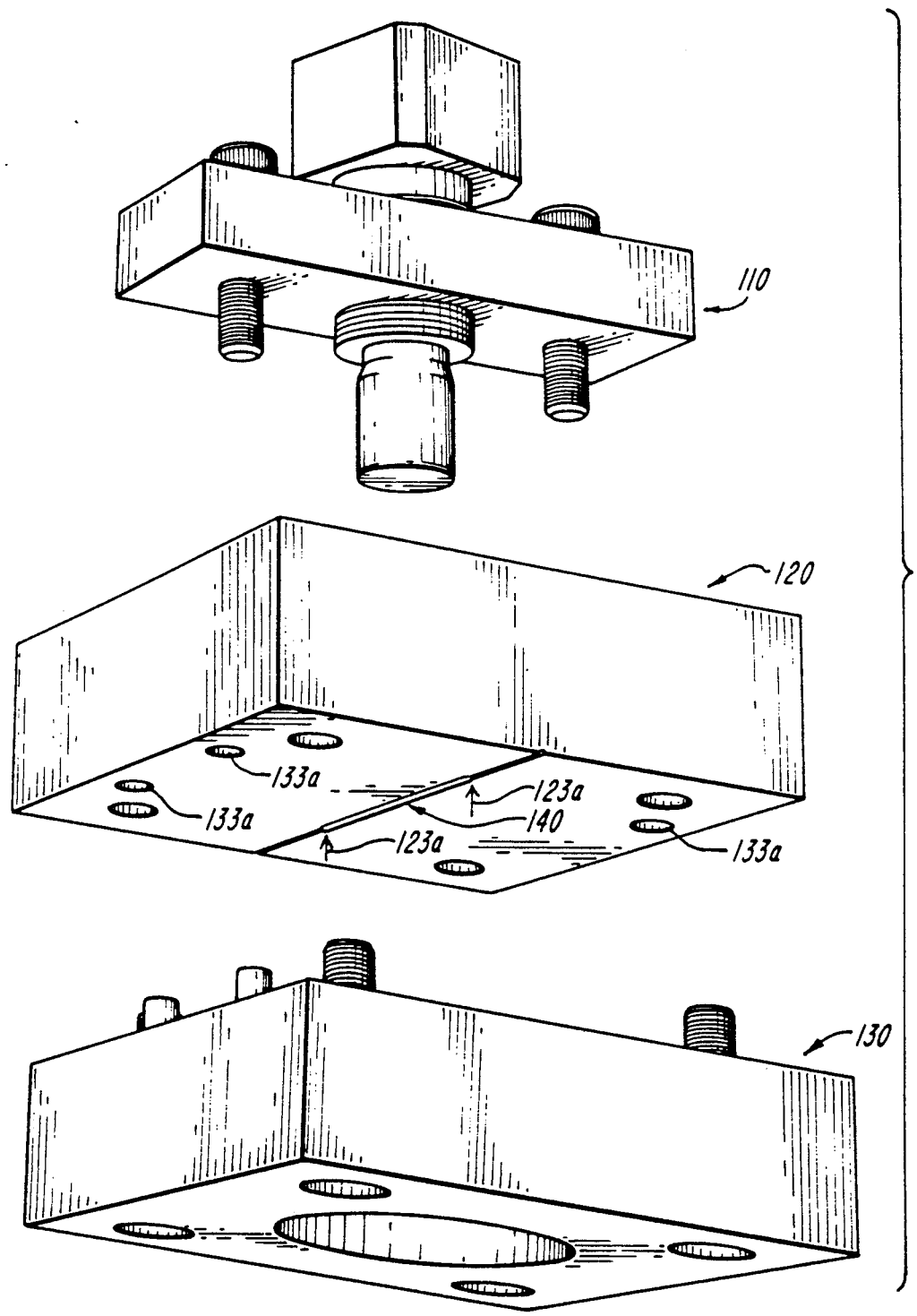

FIGS. 2 and 3 show different perspective views of a rudimentary fixture 100 for forming such a splice covering. As explained more fully below, this fixture constitutes an injection mold with a transparent window for applying curing radiation to form the cover element 7 about a splice region.

Fixture 100 is comprised of three basic components, namely a fluid pressure mechanism 110, a mold body 120, and a mold cover/curing window assembly 130. The mold body 120 as seen in FIG. 2 has a cylindrical fluid reservoir 121 formed in the body 120 which mates with a screw plunger 111 extending from the pressure mechanism. In operation, the mechanism 110 is bolted to body 120 via bolts 112 and threaded holes 122, so that rotation of the piston assembly 111 pressurizes the fluid in reservoir 121. As visible in FIG. 3, a mold cavity 140 is formed into the lower face of mold block 120. A central passage (123C, FIG. 5) directly connects reservoir 121 with the mold cavity 140 for filling the cavity. Similarly, a pair of bleeder passages 123 (FIG. 2) communicate between an open outside face of block 120 and the end regions of cavity 140, at locations roughly indicated by arrows 123a (FIG. 3). Bleeder tubes (not shown) may be fitted to the passages 123 in operation.

Figure 4:
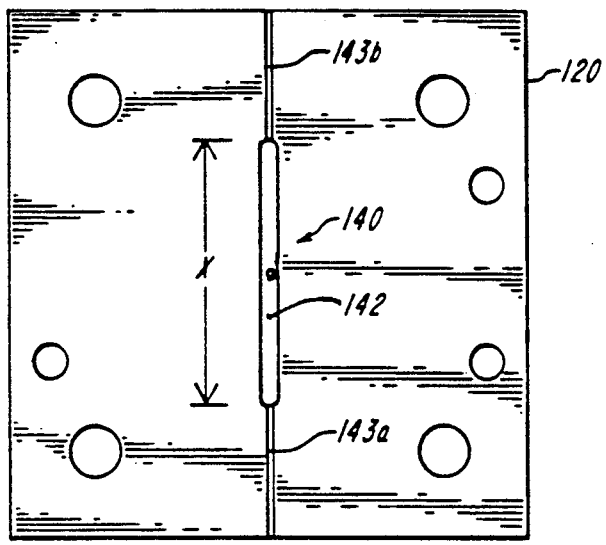
FIG. 4 is a bottom plan view of a portion of the jig of FIGS. 2 and 3.

The overall shape and layout of the mold cavity 140 is best seen in the bottom plan view of block 120, FIG. 4. It has a central region 142 which is a groove of uniform cross-sectional area extending for a distance X of two to five centimeters, slightly longer than the bare length of a spliced fiber, and the same size as the intended cover block (FIG. 1). Leading into cavity 142 from each side are smaller grooves 143a, 143b which are sized to securely receive the jacketed portions 3a, 3b of the fiber.

Continuing with a description of the illustrated prototype injection molding fixture, cover assembly 130 has a flat surface 131 into which is set an optical flat 132 which is fifty millimeters diameter by ten millimeters thick, resting on a 0.1 millimeter thick teflon cushioning washer. The two blocks are aligned so that a pair of nubs 135a, 135b are aligned with the jacket-holding lead-in grooves 143a, 143b of the mold cavity. Three asymetrically placed alignment pins 133 cooperate with corresponding holes 133a in the mold body to assure that the two mold portions 120, 130 come together in alignment so that the nubs are not damaged against the face of block 120. The nubs 135a, 135b extend slightly above the surface 131 to position the ends of the fiber jackets centrally in the larger cavity 142.

By way of scale, a fixture designed for a fiber having a jacket of 0.015" diameter was machined by milling the large central groove 142 into block 120 with a 1 millimeter wide substantially square profile. The side walls were inwardly tapered by several degrees providing the necessary draft for the mold cavity, and all cavity surfaces were highly polished. Each lead in groove 143a, 143b was made 0.014" deep and 0.016" wide. The bleeder holes 123 were approximately 0.010' diameter. The piston assembly of the fluid pressure mechanism 110 was finely screw threaded beryllium copper member 114 with a high-tolerance front piston portion 111 and a stepped shoulder 115 positioned to bottom out against a corresponding step in bore 121 so that neither the threaded upper portion 116 nor the precision piston portion 111 experience damaging pressure. The block 110 was bolted to block 120 with spring washers 117 and the bolt holes in block 110 were oversize, so that, as the bolts 112 are brought down, the assembly might shift slightly to exactly center the piston 111 in the reservoir bore 121. Blocks 110, 120 and 130 were all formed of stainless steel, and use of the dissimilar beryllium copper material for the screw assured that neither the screw nor the piston would bind or cold-weld to its block.

Figure 5:
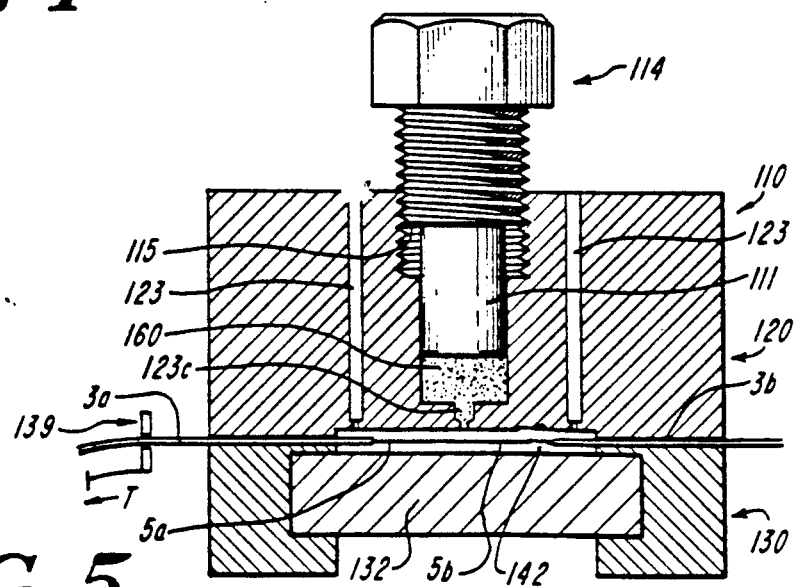
FIG. 5 is a schematic cross sectional view of the jig of FIGS. 2-4.

FIG. 5 shows a schematic cross-sectional view of the assembly of FIGS. 2-4 in use, with a spliced fiber positioned in the cavity 142. The coating polymer is indicated by numeral 160, and all other elements are numbered as in the preceding Figures.

The method of use of the fixture is as follows. The mold cavity was first coated with a mold release coating having of a dispersion of Teflon (five micron) in a freon base (Dupont VYDAX), and was baked for several hours at 500° F. A spliced fiber was then placed in the mold cavity and the rover assembly 130 was attached to close the cavity. The reservoir was filled with a degassed UV-curable coating material. For a Corning fiber, a Drw Q3-6662 material was used. A Desoto formulation was used for Lightwave or Fujikura fibers. In each case, the material was the material identified by the fiber manufacturer as its normal jacket material, or was a material specially promoted for fiber optic jacketing applications. The mold cavity is then bathed in ultraviolet radiation through the window 132, after which the cover assembly 130 was removed and the covered fiber taken from the mold. The resulting fiber coating was well centered, and therefore would display uniform properties under bending, thermal cycling and other stress-causing physical perturbations.

The foregoing Figures show one rudimentary embodiment of a device for injection molding a jacket over a splice region of a fiber, which for purposes of illustration, has been shown as a single strand, formed of two segments joined end-to-end at the center, and having a jacket portion 7 molded of a single material. However, the invention contemplates variations of mold and processing features to suit the characteristics of the fibers and type of splice involved.

For example, by providing two different mold blocks 120, 120' in which the central mold cavities are of different cross-sectional size, one practice of the invention proceeds by first injection molding a thin inner jacket of one material, and then injection molding a thicker outer jacket which may be formed of a second material. The inner material may be a very low modulus polymer to shield the fiber from mechanical contact stresses, while the second material may be a higher modulus material or one which provides greater protection against mechanical and chemical perturbations. Further, while the Figures have shown a central jacket portion which is thicker than the normal jacket and extends in a sleeve or cuff-like extension over the ends of the normal jacket, the central mold cavity 142 may be formed substantially the same size as the normal jacket, so that the injection-molded jacket portion 7 seals end-to-end against the ends of the fiber jacket 3a, 3b on each side. The pressure of the injection process, and proper placement of the bleeder holes, assure that a good junction is obtained with the ends of the existing jacket.

Figure 6A:
FIG. 6(A)-6(C) illustrate alternative embodiments.
Figure 6B:
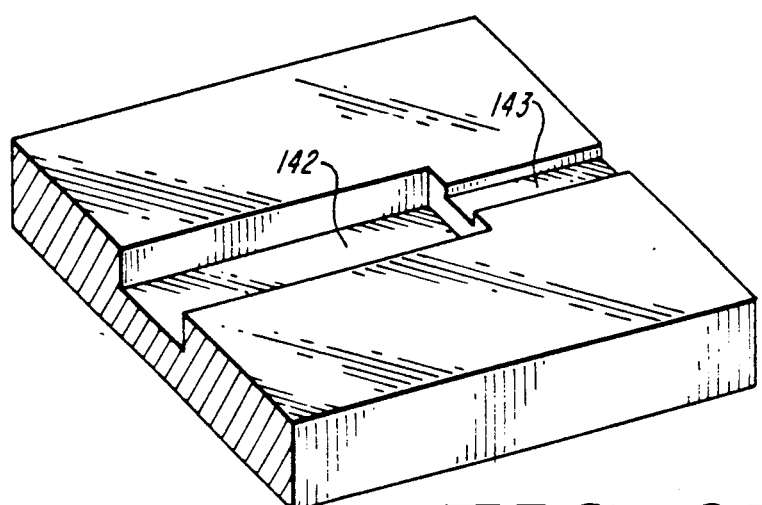
Figure 6C:
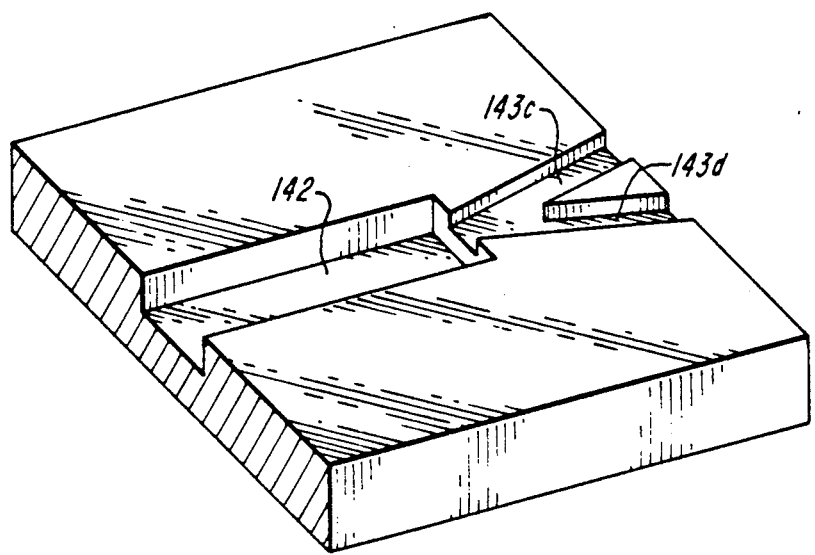

The invention further lends itself to recoating of fused fiber optic biconical tapered couplers, and also coupler sensors. To accomplish this, a mold is used having a lead-in groove 143 which is sized to accommodate two fiber jackets side-to-side, or a pair of narrowly divergent lead-in grooves 143c, 143d are used, one for each lead-in-fiber, on a side. FIG. 6(A)-6(C) show such a fiber coupler and corresponding mold cavity configurations.

Thus, the invention provides a general method for packaging optical fiber junctions. As such, it is readily applied to encapsulate a fiber junction of a diode laser, integrated optics chip, isolator, detector or other discrete optical signal element having a fiber pigtail as its input or output path, which is joined to other elements of an instrument in use.

The foregoing description of illustrative embodiments of the invention and its method of practice is intended to teach, but not limit, the principals of the invention. Following the teachings herein, a person skilled in the art will readily adapt the invention to other forms in different variations to meet the requirement of various specific applications, and all such variations and modifications are considered to be within the scope of the invention in which patent rights are claimed.

What is claimed is:

1. Apparatus for forming a protective covering over a fused optical fiber junction, such apparatus comprising a die block having an open-sided cavity formed in a surface thereof and having successive first, second and third regions, at least said first and third regions being of cross-sectional dimension for sealingly accommodating a jacketed optical fiber and said second region extending between said first and third regions to accommodate an unclad fiber portion extending therebetween, said die block further including a bleeder passage communicating with said cavity to provide fluid egress therefrom, means for injecting a coating medium into said cavity, and means for illuminating at least said second region of the cavity, whereby when a fiber splice is positioned in said cavity with its fused optical fiber junction positioned in the second region and jacketed regions of the fiber are positioned in said first and third regions of the die block, a coating medium injected into the cavity is cured to form a protective covering of the fiber splice extending between the jacketed regions of the fiber.

2. Apparatus according to claim 1, wherein said first, second and third regions are successive adjacent segments of a groove.

3. Apparatus according to claim 1, wherein said means for injecting a coating medium meters a quantity of said medium into the second region.

4. Apparatus according to claim 1, wherein said means for illuminating includes a cover plate formed of a UV transmissive material for closing the cavity.

5. Apparatus for forming a protective covering over a fused optical fiber junction located between jacketed fiber portions, such apparatus comprising a first injection molding die having a mold cavity sized to removably receive the fiber junction and at least one inlet groove which receives and is closed by a jacketed fiber portion, means for metering a selected quantity of a curable medium into the cavity, and means for applying curing radiation to said mold cavity for curing the medium thereby forming a protective covering of defined size over said junction.

6. Apparatus according to claim 5, wherein aid means for applying curing radiation includes a radiation transmissive window removably secured over said cavity to close the cavity when the fiber junction is positioned therein.

7. Apparatus according to claim 5, further including a second injection molding die having a mold cavity sized to receive the protective covering formed by the cavity of the first injection molding die, for forming an outer protective jacket over said protective covering.

8. A method of recoating a fiber optic junction located between jacketed portions of a fiber, such method comprising the steps of i) placing a bare fiber optic junction in an injection molding cavity having fiber inlet passages dimensioned to securely fit about jacketed portions of fiber, ii) filling the cavity with a curable coating material while bleeding off excess coating material from the cavity, and iii) irradiating the filled cavity through a cover plate to cure the coating material thereby forming a cover of defined size over the junction.

9. The method of claim 8, further comprising the steps of after forming the cover placing the covered fiber optic junction in a mold cavity larger than the injection molding cavity, and repeating the steps of filling, bleeding and irradiating to form an outer cover over the previously formed cover, thereby providing a two layer cover coating the junction.

10. The method of claim 9, wherein the step of filling the cavity includes filling with a compliant coating medium to cover the bare fiber junction, and filling with a less compliant coating medium to form the outer cover.

11. A fiber optic splice assembly comprising a first and a second jacketed fiber segment each having an unjacketed region bout a junction at which the first and second segments are fused together, and a protective covering molded as a body of metered volume about said junction and entirely covering said unjacketed regions, said protective covering extending between jacketed portions of the fiber and being cured in situ by illuminating to provide a substantially homogeneous recoating jacket having properties matched to properties of the jacketed fiber segments.

12. A fiber optic optic splice assembly according to claim 11, wherein a said jacketed fiber segment connects to an optical sensing or processing element.

13. A fiber splice assembly according to claim 11, wherein said first and second segments are segments of a fused biconical taper coupler.

14. A method of forming a protective coating over a fiber junction, such method comprising the steps of i) placing the junction in an injection molding block such that jacketed portions of the fiber close off passages leading to a central cavity in which the junction is positioned, ii) filling the cavity with a defined volume of curable medium, and curing the medium to form a homogeneous protective body covering a region about the junction, and iii) removing the junction from the cavity.

15. Apparatus for forming a protective covering over a fused optical fiber junction, such apparatus comprising a die block having an open-sided cavity formed in a surface thereof and having successive first, second and third regions, at least said first and third regions being of cross-sectional dimension for closely accommodating a jacketed optical fiber and said second region extending between said first and third regions to accommodate an unclad fiber portion extending therebetween means for metering a quantity of a coating medium into the second region of said cavity, and means for illuminating at least said second region of the cavity, whereby when a fiber splice is positioned in said cavity with its fused optical fiber junction positioned in the second region, a coating medium enters said cavity and is cured to form a protective covering of the fiber splice extending between jacketed regions of the fiber.

* * * * *